United States Patent [19]

Campbell

[11] Patent Number: 4,815,777
[45] Date of Patent: Mar. 28, 1989

[54] SELECTIVELY MOVABLE PROTECTIVE MOLDING AND METHODS OF CONSTRUCTING AND UTILIZING SAME

[76] Inventor: Kenneth J. Campbell, 1511 Water St., Port Huron, Mich. 48060

[21] Appl. No.: 83,194

[22] Filed: Aug. 10, 1987

[51] Int. Cl.$^4$ .................. B60R 19/20; B60R 19/42
[52] U.S. Cl. ...................................... 293/107; 293/128
[58] Field of Search ................. 293/1, 102, 127, 128, 293/107; 428/31; 267/64.27, 64.28; 280/770

[56] References Cited

U.S. PATENT DOCUMENTS

| | | | |
|---|---|---|---|
| 1,834,824 | 12/1931 | Brown | 293/102 |
| 2,933,308 | 4/1960 | McGavern, Jr. et al. | 267/64.27 X |
| 3,160,407 | 12/1964 | Vaugoyeau | 267/64.27 X |
| 3,588,159 | 6/1971 | Duckett | 293/107 |
| 3,708,194 | 1/1973 | Amit | 293/107 X |
| 3,718,357 | 2/1973 | Hertzell | 293/9 |
| 3,741,598 | 6/1973 | Novak et al. | 293/107 |
| 3,764,174 | 10/1973 | Taninscz | 293/107 |
| 4,234,222 | 11/1980 | Bays | 293/124 |
| 4,441,751 | 4/1984 | Wesley | 293/107 X |
| 4,461,503 | 7/1984 | Melby | 293/118 |
| 4,509,730 | 4/1985 | Shtarkman | 267/64.27 |
| 4,518,154 | 5/1985 | Merkle | 267/64.27 X |
| 4,530,519 | 7/1985 | Marshall | 280/770 |

FOREIGN PATENT DOCUMENTS

2318740  10/1974  Fed. Rep. of Germany ...... 293/107

Primary Examiner—Robert B. Reeves
Assistant Examiner—Russell D. Stormer
Attorney, Agent, or Firm—Irving M. Weiner; Joseph P. Carrier; Roland W. Norris

[57] ABSTRACT

A trim guard assembly apparatus to be used in combination with a vehicle body having an outer protective member, an inner base member, and a flexible, intermediate substantially hollow closure provided therebetween. The hollow closure may be selectively filled with or emptied of a fluid, thereby respectively expanding or retracting the protective member. In use, when in a parked position, the protective member is expanded thereby absorbing minor impacts such as outswung doors, protected shopping carts and the like. When the vehicle is in motion, the protective member is retracted, thereby reachieving aerodynamic streamlining of the automotive vehicle.

17 Claims, 1 Drawing Sheet

SELECTIVELY MOVABLE PROTECTIVE MOLDING AND METHODS OF CONSTRUCTING AND UTILIZING SAME

BACKGROUND OF THE INVENTION

1. Field of the Invention

The present invention relates to automobile protection systems, and specifically relates to protective trim capable of being selectively extended or retracted.

When a vehicle fitted with the protective system of the present invention is in motion, the guard is in its retracted position, thereby not interfering with the aerodynamics of the vehicle. When the vehicle is parked, the operator selectively switches the trim into its extended position, thereby extending the trim away from the vehicle. In this protruded state, the trim guard can absorb minor dents and dings such as those caused by outswung doors of other vehicles.

2. Description of the Relevant Art

The relevant art is exemplified by: Hertzell U.S. Pat. No. 3,718,357 entitled "RETRACTABLE SIDE BUMPER GUARD"; Bays U.S. Pat. No. 4,234,222 entitled "PROTECTIVE DEVICE FOR AUTOMOBILES"; Melby U.S. Pat. No. 4,461,503 entitled "ELECTRIC BODY TRIM GUARD FOR AUTOMOBILES"; and Marshall U.S. Pat. No. 4,530,519 entitled "VEHICLE CAR DOOR PROTECTION SYSTEM".

The present invention includes features which are not taught or suggested by the relevant art.

SUMMARY OF THE INVENTION

The present invention provides a trim guard assembly apparatus to be used in combination with an automotive vehicle body. The apparatus is comprised of an outer protective member and a base member with a substantially hollow flexible closure selectively fillable with a fluid to thereby extend the protective portion from the base portion. When the fluid is withdrawn, the protective member retracts to its at rest position. The extended position is selected when the vehicle is parked; the retracted position is selected when the vehicle is in motion to reachieve aerodynamic streamlining.

An object of the trim guard assembly as hereinabove described is to provide such a device which is inexpensive to manufacture and maintain.

Another object of the present invention is to provide such a device which may be adapted to a variety of vehicles, including automobiles, vans, light trucks, buses, etc.

Yet another object of the present invention is to provide such a device which is functional as well as aesthetically pleasing.

An additional object of the present invention is to provide such a device which may use a variety of fluids, including gases or liquids.

Still another object of the present invention is to provide a vehicle trim guard apparatus which may be operated by conventional means, including key locks, switches, buttons or the like.

An additional object of the present invention is to provide such an apparatus which may be incorporated into the vehicle at the time of manufacture or sold and adapted to the vehicle as an after market component.

The above and further objects, features and advantages of the present invention will become apparent from the following detailed description of the preferred embodiments of the invention, when read in conjunction with the accompanying drawings.

DETAILED DESCRIPTION OF THE PREFERRED EMBODIMENTS

The trim guard apparatus according to the present invention illustrates a novel system of applying extendable trim to vehicles for protection. The apparatus is entirely self-contained, requiring only minimal or no maintenance for a long term of effective and protective operation.

Figure 1:
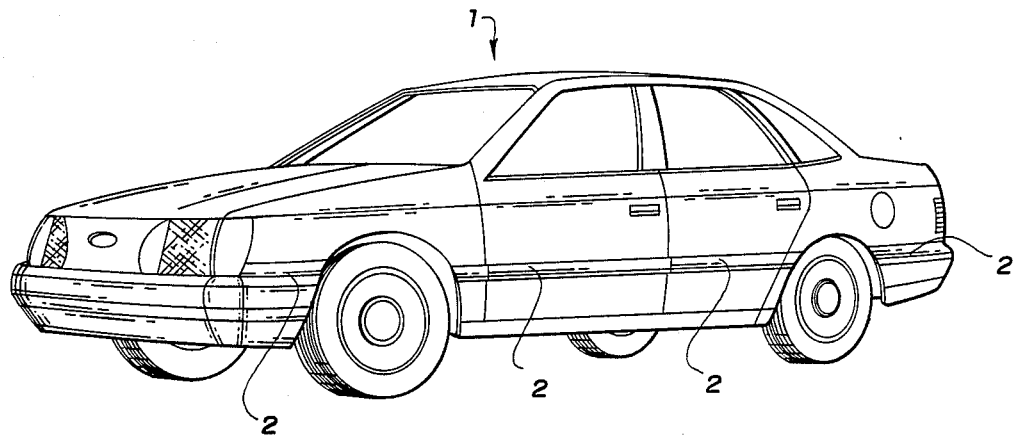
FIG. 1 illustrates a perspective view of a vehicle showing the relative position of the trim guard apparatus according to the present invention.
Figure 2:
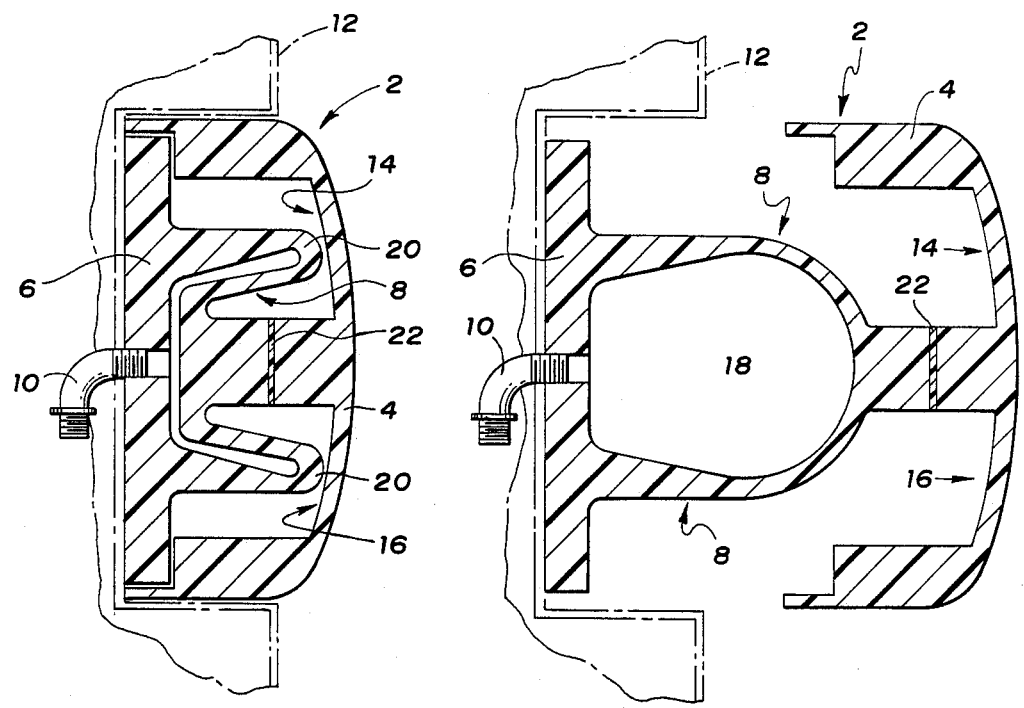
FIG. 2 illustrates a sectional view of the device in its retracted position.
Figure 3:
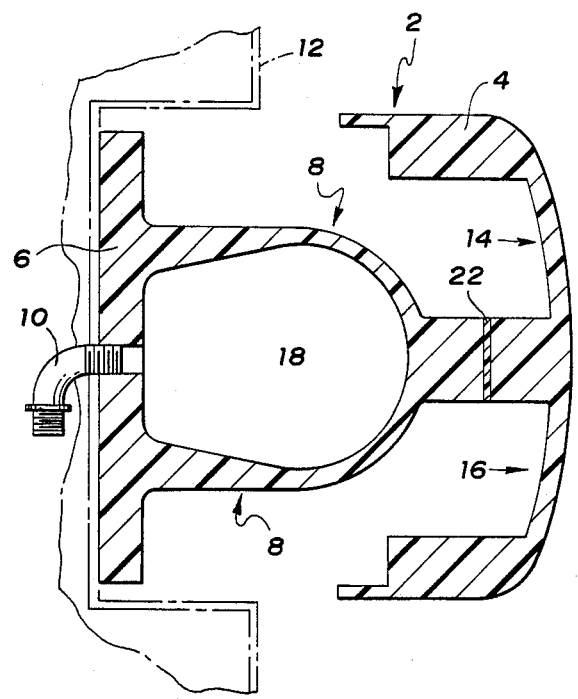
FIG. 3 illustrates a sectional view of the device in its extended position.

FIGS. 1-3 illustrate the device in anticipated use and the novel principal working elements of the device.

With reference now to FIG. 1, there is shown a vehicle, generally indicated by 1, provided with the trim guard apparatus 2 according to the invention. While the illustration applies trim guard 2 to a conventional automobile, it is to be understood that trim guard 2 may be affectively provided on other motorized vehicles including, but not limited to, vans, light trucks, buses, travel homes, and the like.

Furthermore, while FIG. 1 illustrates trim guard 2 as being provided in a horizontal position relative to automobile 1 as molding at the approximate mid-point of the doors and fenders thereof, it is to be understood that trim guard 2 may be provided in alternate positions and places on automobile 1.

Additionally, FIG. 1 illustrates trim guard 2 as being positioned on the sides of automobile 1. With minimal adaptation which would be easily understood by one skilled in the art, the present invention may also be applied to function as a vehicle's bumper, thereby embodying the bumpers with the extension and retraction characteristics described in the present application.

With reference now to FIGS. 2 and 3, there are shown sectional views of the device according to the present invention as seen in both the fully retracted and fully extended positions respectively.

Referring now to FIG. 2, a sectional view of the device of the present invention shows the trim guard apparatus 2.

Trim guard 2 is fitted to an automobile body panel, generally illustrated by 12. While panel 12 is shown as being indented to accommodate trim guard 2, this is not compulsory, as guard 2 may be fitted directly to a flat body panel, such as when the protective system is furnished as an after market component.

Trim guard 2 is preferably, but not exclusively, comprised of an outer protective member 4 and inner base member 6. Between protective member 4 and base member 6 is an expandable intermediate area generally indicated by 8.

Still with reference to FIG. 2, and as can be easily seen therein, expandable intermediate portion 8 is collapsible onto itself, with the overfolded excess, generally indicated as 20, fittingly accommodated into upper channel 14 and lower channel 16 formed in the backside of protective member 4.

To allow the inflow and outflow of expanding fluids (not shown), a vent line 10 is conventionally provided in the backside of inner base member 6 and communicates with the inside of the closure formed inside expandable intermediate portion 8. One or more vent lines are provided as required. Vent line 10 terminates inside of the automobile body panel 12 and is therefore connected to an internal fluid conduit distribution system (not shown).

Inner base member 6, which substantially includes expandable intermediate portion 8, is commercially available under the product name "Inflatable Seal", codes G-9, G-11, G-16, G-17 or G-18, sold by Seal Master Corp. of Kent, Ohio. For application to the present use, outer protective member 4 is attached thereto at contact area 22 and the open ends of the closure formed inside intermediate portion 8 are selectively sealed at each end of each trim guard unit.

With reference now to FIG. 3, there is shown trim guard 2 in the extended position, with protective member 4 extended out from its retracted position relative to base member 6. As is easily understood, extension is effected by the introduction of fluids through vent line 10 into the hollow closure disposed within expandable intermediate portion 8. The fluid filled closure is generally indicated by 18.

The expanding fluid may either be a gas or a liquid as preferred. If a gas, cushioning characteristics would be increased in accordance with the compressability of gases. Conversely, if a liquid is selected, the trim guard apparatus would be firmer. Where liquid is selectively employed, the liquid would have a low freezing point for use in cold climates.

Whether a gas or liquid is employed, the fluid is pumped into or withdrawn from closure 18 by means of a conventional pump (not shown). The pump may be either electrical or provided as a conventional power take-off from the engine crankshaft pulley and having a pressurized fluid storage tank fitted thereto for maintaining pressure after the vehicle's engine is switched off.

The extension or retraction of trim guard 2 may be selected by conventional means (not shown) which preferably, but not exclusively, include a key lock system provided in the driver's door, or a conventional switching means such as a switch, dial, knob and the like provided in the driver's compartment.

In use, the guards are in a retracted position while the vehicle is in motion. After the driver brings the vehicle to a stop, he either engages the trim into the extended position from within the vehicle before exiting, or, after exiting, turns a key provided in the vehicle's door. The guards remain in their extended position while the vehicle is parked. Retraction is accomplished by reversing the above described procedure.

The present invention is not restricted to the particular structure and examples described above and illustrated in the attached drawings. Various modifications and variations can be made in the described structure by those skilled in the art without exceeding the scope of the invention as claimed hereinbelow.

I claim:

1. A trim guard assembly apparatus to be used in combination with a vehicle body panel comprising:
   an airtight collapsible tube having an inner side and an outer side;
   said inner side fittable to at least one portion of said vehicle body and residing substantially on the exterior of said vehicle body panel having a closed, substantially hollow flexible intermediate portion;
   said hollow flexible intermediate portion capable of removably receiving a fluid to selectively retract or extend said protective member with respect to said base member.

2. A trim guard assembly apparatus according to claim 1, wherein:
   said back side of said base member having one or more through-openings formed therein for the passage of said fluid selectively into and out of the hollow of said intermediate portion by a selfcontained internal fluid conduit distribution system.

3. A trim guard assembly apparatus according to claim 1, wherein:
   said trim guard is comprised of a material selected from the group consisting of polymerized compounds.

4. A trim guard assembly apparatus according to claim 1, wherein:
   said trim guard is selectively in a retracted position when said vehicle is in motion, and in a preselected extended position when said vehicle is parked.
   said outer member interconnected with said inner member by means of an intermediate flexible hollow closure having an inside and an outside capable of selectively expanding or retracting thereby providing for the extension or retraction of said outer member relative to said inner member;
   said expansion or retraction effected by the inflow or outflow of a fluid from said inside of said flexible hollow closure; and
   said trim guard assembly fittable to at least one portion of said vehicle body.

5. A trim guard assembly apparatus to be used in combination with a vehicle body, comprising:
   an elongate protective member having an inner side and an outer side;
   an elongate base member having a front side and a back side fittable to at least one portion of said vehicle body;
   said base member having disposed on its front side a substantially hollow flexibly collapsible elongate intermediate portion;
   said inner side of said protective member having an upper elongate channel, a lower elongate channel, and an elongate projection contiguous to said intermediate portion of said base member;
   said intermediate portion being capable of removably receiving a fluid to selectively retract or extend said protective member with respect to said base member; and
   said intermediate portion being capable of substantially collapsing onto itself.

6. A trim guard assembly apparatus according to claim 5, wherein:
   said back side of said base having one or more through-openings formed therein for the passage of said fluid in and out of the hollow of said intermediate portion.

7. A trim guard assembly apparatus according to claim 5, wherein:
   said fluid is a gas.

8. A trim guard assembly apparatus according to claim 5, wherein:
   said fluid is a liquid.

9. A trim guard assembly apparatus according to claim 5, wherein:

said protective member, said base member and said intermediate portion are comprised of material selected from the group consisting of polymerized compounds.

10. A trim guard assembly apparatus according to claim 5, wherein:
said protective member is selectively in a retracted position relative to said base member when said vehicle is in motion and in a preselected extended position relative to said base member when said vehicle is parked.

11. A trim guard assembly apparatus according to claim 5, wherein:
said assembly is disposed substantially horizontally on said vehicle as side molding.

12. A trim guard assembly apparatus to be used in combination with a vehicle body, comprising:
a elongate outer member;
a elongate inner member;
said outer member interconnected with said inner member by means of an intermediate flexible hollow closure having an inside and an outside capable of selectively expanding or retracting thereby providing for the extension or retraction of said outer member relative to said inner member;
said expansion or retraction effected by the inflow or outflow of a fluid from said inside of said flexible hollow closure; and
said trim guard assembly fittable to at least one portion of said vehicle body.

13. A trim guard assembly apparatus according to claim 12, wherein:
said inner member having one or more through-openings formed therein for the passage of said fluid into and out of said hollow closure.

14. A trim guard assembly apparatus according to claim 12, wherein:
said fluid is a gas.

15. A trim guard assembly apparatus according to claim 12, wherein:
said fluid is a liquid.

16. A trim guard assembly apparatus according to claim 12, wherein:
said first outer member and said second inner member are comprised of material selected from the group consisting of polymerized compounds.

17. A trim guard assembly apparatus according to claim 12, wherein:
said outer member is selectively in a retracted position relative to said inner member when said vehicle is in motion and in a preselected extended position relative to said inner member when said vehicle is parked.

* * * * *